US012431646B2

(12) United States Patent
Yao et al.

(10) Patent No.: US 12,431,646 B2
(45) Date of Patent: Sep. 30, 2025

(54) ELECTRIC CONNECTOR AND CONNECTOR ASSEMBLY WITH LESS SPACE OCCUPATION

(71) Applicant: DONGGUAN LUXSHARE TECHNOLOGIES CO., LTD, Dongguan (CN)

(72) Inventors: Kunlin Yao, Dongguan (CN); Rongzhe Guo, Dongguan (CN); Chuanqi Gong, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 502 days.

(21) Appl. No.: 17/867,080

(22) Filed: Jul. 18, 2022

(65) Prior Publication Data

US 2023/0025672 A1 Jan. 26, 2023

(30) Foreign Application Priority Data

Jul. 21, 2021 (CN) ......................... 202121669092.4

(51) Int. Cl.
*H01R 12/77* (2011.01)
*H01R 12/79* (2011.01)
*H01R 12/70* (2011.01)
*H01R 13/24* (2006.01)

(52) U.S. Cl.
CPC ........... *H01R 12/771* (2013.01); *H01R 12/79* (2013.01); *H01R 12/7047* (2013.01); *H01R 13/2442* (2013.01)

(58) Field of Classification Search
None
See application file for complete search history.

(56) References Cited

U.S. PATENT DOCUMENTS

| | | | | |
|---|---|---|---|---|
| 10,784,603 | B2 * | 9/2020 | Lloyd | H01R 12/714 |
| 10,944,215 | B2 * | 3/2021 | Chua | H01R 13/502 |
| 11,431,131 | B2 * | 8/2022 | Lv | H01R 13/6582 |
| 11,495,909 | B2 * | 11/2022 | Laurx | H01R 13/6594 |
| 2024/0039213 | A1 * | 2/2024 | Xiao | H01R 13/6597 |

FOREIGN PATENT DOCUMENTS

| | | |
|---|---|---|
| CN | 106450856 B | 11/2018 |

* cited by examiner

*Primary Examiner* — Ross N Gushi

(74) *Attorney, Agent, or Firm* — Birch, Stewart, Kolasch & Birch, LLP

(57) ABSTRACT

An electrical connector includes a base, a number of first conductive terminals and a number of second conductive terminals. The base includes a mounting surface. Each first conductive terminal includes a first elastic arm. Each second conductive terminal includes a second elastic arm. The first elastic arm and the second elastic arm include a first abutting portion and a second abutting portion, respectively, for abutting against a circuit board. The present disclosure also discloses a connector assembly having the electrical connector. Compared with the prior art, the present disclosure reduces a space occupied by the first elastic arm and the second elastic arm by setting extension directions of the first elastic arm and the second elastic arm to be opposite. As a result, it is beneficial to miniaturization of the electrical connector and the connector assembly.

18 Claims, 15 Drawing Sheets

ELECTRIC CONNECTOR AND CONNECTOR ASSEMBLY WITH LESS SPACE OCCUPATION

CROSS-REFERENCE TO RELATED APPLICATION

This patent application claims priority of a Chinese Patent Application No. 202121669092.4, filed on Jul. 21, 2021 and titled "ELECTRIC CONNECTOR AND CONNECTOR ASSEMBLY", the entire content of which is incorporated herein by reference.

TECHNICAL FIELD

The present disclosure relates to an electrical connector and a connector assembly, which belongs to a technical field of wire-to-board connectors.

BACKGROUND

An existing wire-to-board connector usually includes an insulating body and a plurality of conductive terminals fixed to the insulating body. The conductive terminals include a plurality of first conductive terminals and a plurality of second conductive terminals. The first conductive terminals include first elastic arms arranged in a first row. The second conductive terminals include second elastic arms arranged in a second row. The first elastic arms and the second elastic arms extend in a same direction. However, this design takes up a lot of space.

SUMMARY

An object of the present disclosure is to provide an electrical connector and a connector assembly which take up less space.

In order to achieve the above object, the present disclosure adopts the following technical solution: an electrical connector, including: a base, the base including a mounting surface; a plurality of first conductive terminals, the first conductive terminals being disposed on the base, each first conductive terminal including a first elastic arm protruding beyond the mounting surface; and a plurality of second conductive terminals, the second conductive terminals being disposed on the base, each second conductive terminal including a second elastic arm protruding beyond the mounting surface; wherein the first elastic arm and the second elastic arm extend in opposite directions, the first elastic arm includes a first abutting portion to abut against a circuit board, and the second elastic arm includes a second abutting portion to abut against the circuit board.

In order to achieve the above object, the present disclosure adopts the following technical solution: a connector assembly, including: an electric connector, the electrical connector including: a base, the base including a mounting surface; a plurality of first conductive terminals, the first conductive terminals being disposed on the base, each first conductive terminal including a first elastic arm protruding beyond the mounting surface; and a plurality of second conductive terminals, the second conductive terminals being disposed on the base, each second conductive terminal including a second elastic arm protruding beyond the mounting surface; wherein the first elastic arm and the second elastic arm extend in opposite directions, the first elastic arm includes a first abutting portion, and the second elastic arm includes a second abutting portion; and a circuit board, the circuit board including a plurality of first conductive pads and a plurality of second conductive pads, the first abutting portions of the first conductive terminals abut against the first conductive pads, and the second abutting portions of the second conductive terminals abut against the second conductive pads.

Compared with the prior art, the present disclosure reduces the occupation of the first elastic arm and the second elastic arm by setting the extension directions of the first elastic arm and the second elastic arm to be opposite, which is beneficial to miniaturization of the electrical connector and the connector assembly.

DETAILED DESCRIPTION

Figure 1:
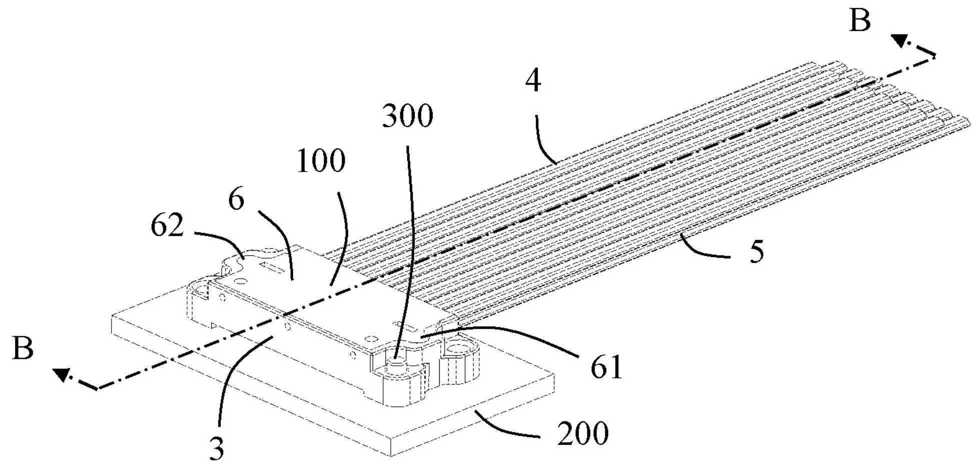
FIG. 1 is a perspective schematic view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
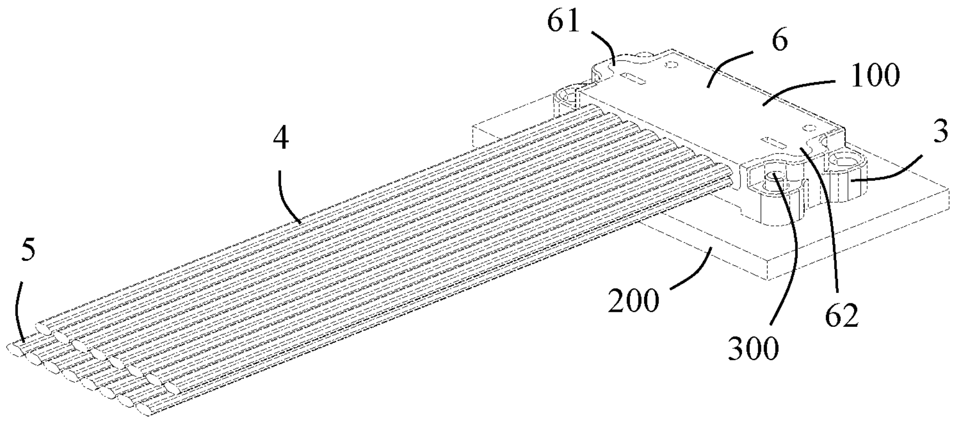
FIG. 2 is a perspective schematic view of FIG. 1 from another angle.
Figure 3:
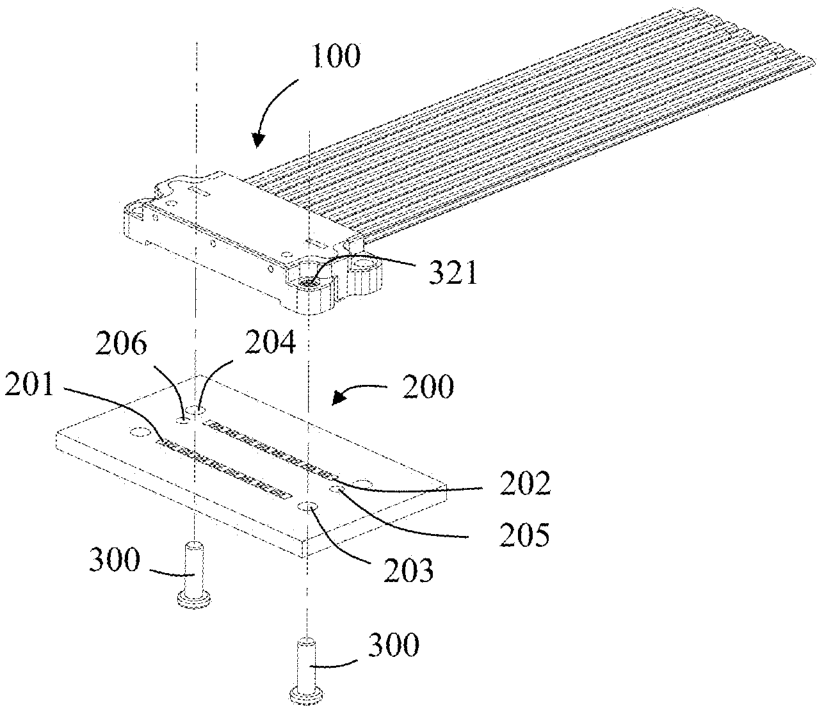
FIG. 3 is a partially exploded perspective view of FIG. 1.
Figure 4:
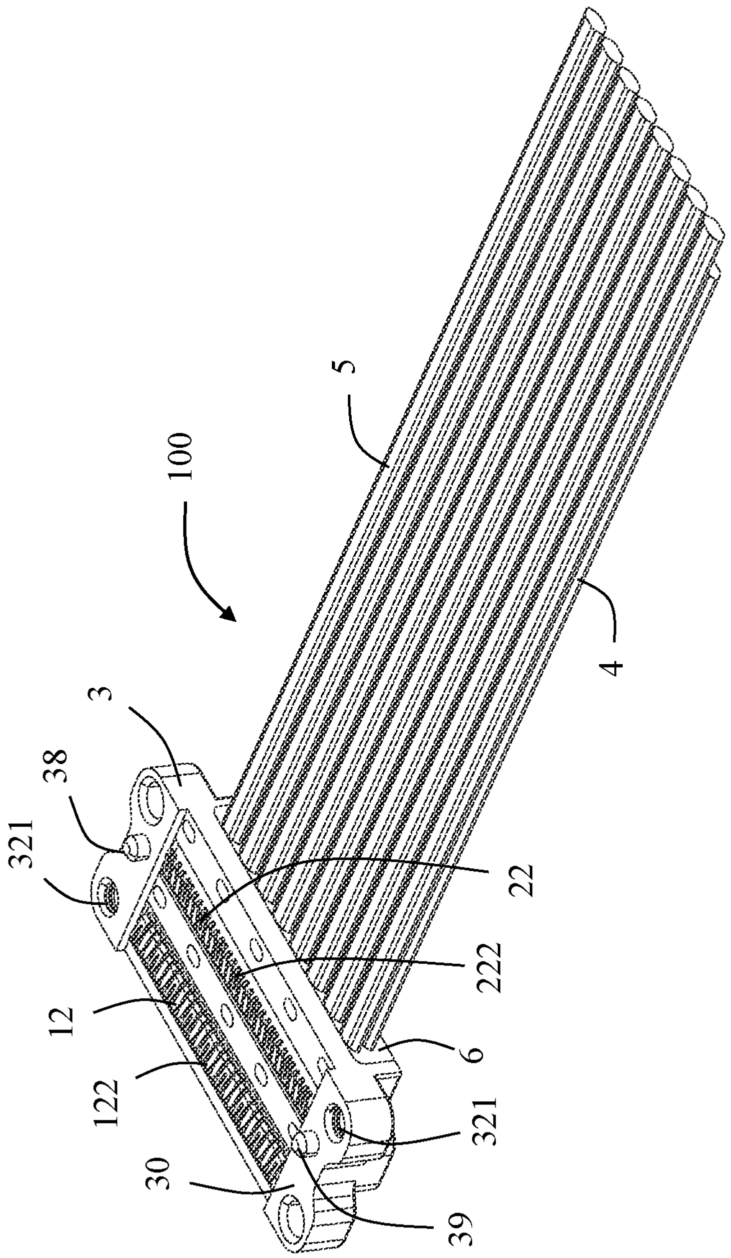
FIG. 4 is a perspective schematic view of an electrical connector of the present disclosure.

Referring to FIGS. 1 to 3, the present disclosure discloses a connector assembly including an electrical connector 100, a circuit board 200, and fasteners 300 for fixing the electrical connector 100 and the circuit board 200. In the illustrated embodiment of the present disclosure, each fastener 300 is a bolt. Two fasteners 300 are provided and located on a diagonal of the electrical connector 100.

Referring to FIG. 3, the circuit board 200 includes a plurality of first conductive pads 201, a plurality of second conductive pads 202, a first through hole 203 and a second through hole 204. The plurality of first conductive pads 201 are disposed in a row. The plurality of second conductive pads 202 are disposed in another row. The plurality of first conductive pads 201 and the plurality of second conductive pads 202 are parallel to each other. The first through hole 203 is located on one side (i.e., a left side) of the plurality of first conductive pads 201, and the second through hole 204 is located on the other side (i.e., a right side) of the plurality of second conductive pads 202. The first through hole 203 and the second through hole 204 are arranged diagonally. The circuit board 200 further includes a first positioning hole 205 located on one side and a second positioning hole 206 located on the other side.

Referring to FIGS. 4 to 10, the electrical connector 100 includes a base 3, a first terminal module 1, a second terminal module 2, a plurality of first cables 4 connected to the first terminal module 1, a plurality of second cables 5 connected to the second terminal module 2, and a cover 6 for mating with the base 3.

The base 3 includes a main body portion 31 and two mounting portions 32 located on two sides of the main body portion 31, respectively. In the illustrated embodiment of the present disclosure, the main body portion 31 is upwardly higher than the mounting portion 32. The mounting portion 32 includes mounting holes 321 located at four corners of the base 3. In the illustrated embodiment of the present disclosure, the mounting holes 321 corresponding to the first through hole 203 and the second through hole 204 are threaded holes so as to mate with the fasteners 300.

Figure 5:
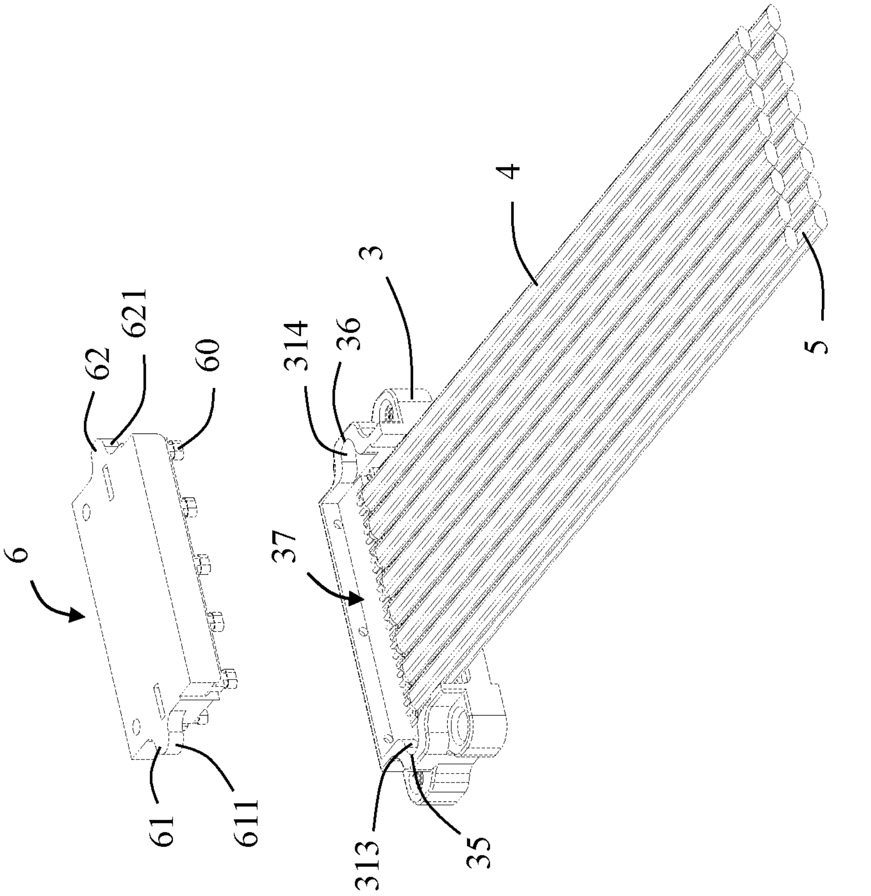
FIG. 5 is a partial perspective exploded view of the electrical connector in FIG. 1.
Figure 6:
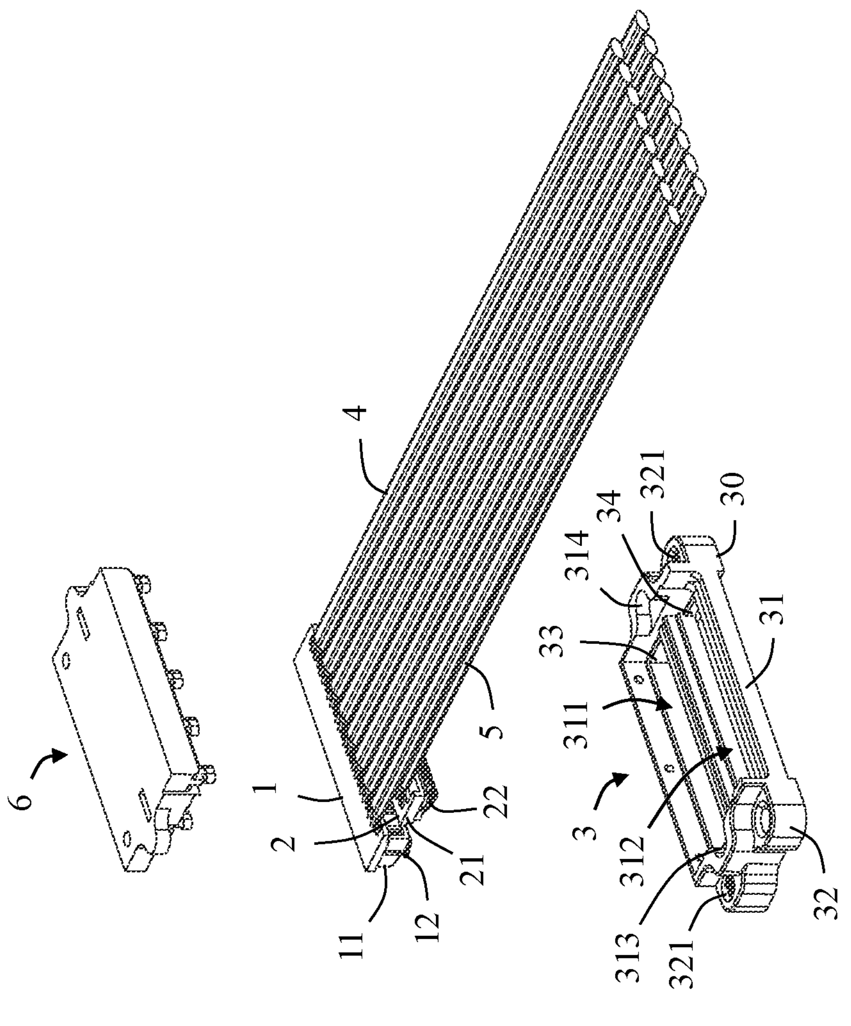
FIG. 6 is a further partial perspective exploded view of FIG. 5.
Figure 7:
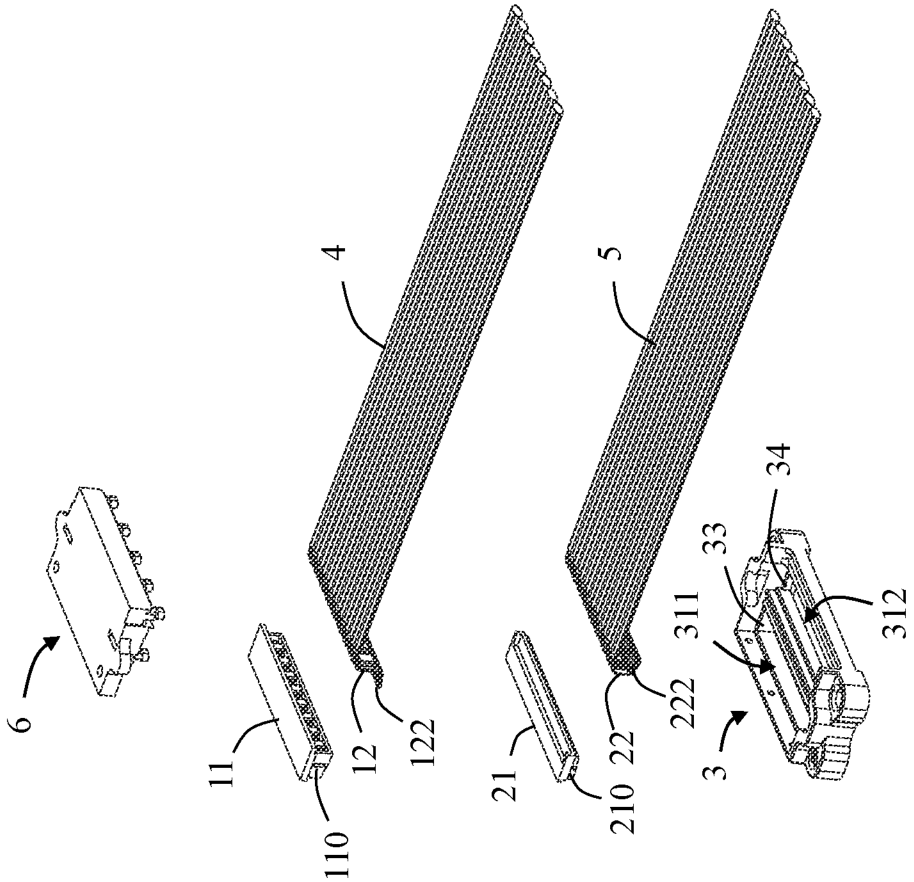
FIG. 7 is a further partial perspective exploded view of FIG. 6.
Figure 8:
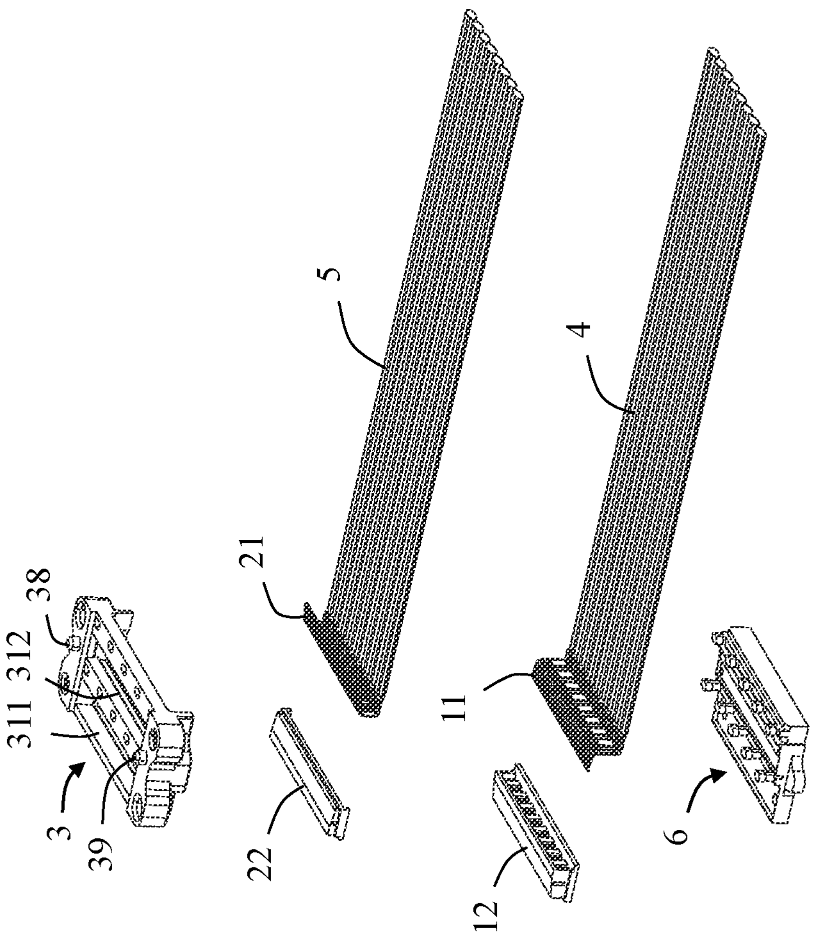
FIG. 8 is a partial perspective exploded view of FIG. 7 from another angle.
Figure 9:
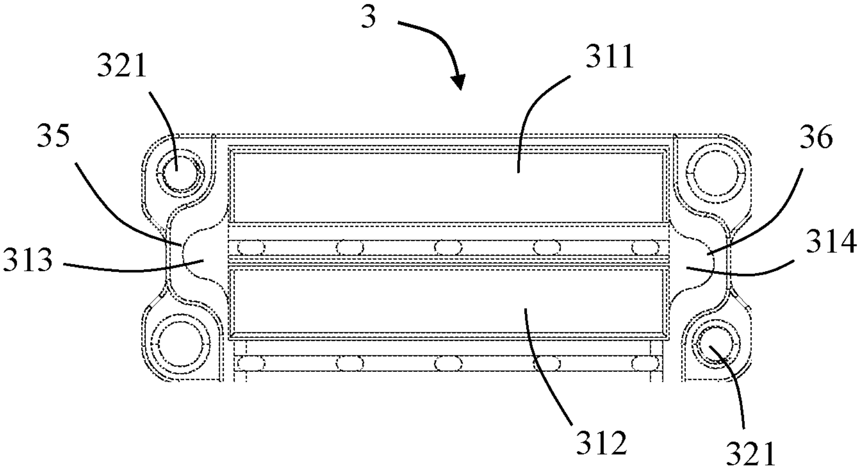
FIG. 9 is a top view of a base in FIG. 6.
Figure 10:
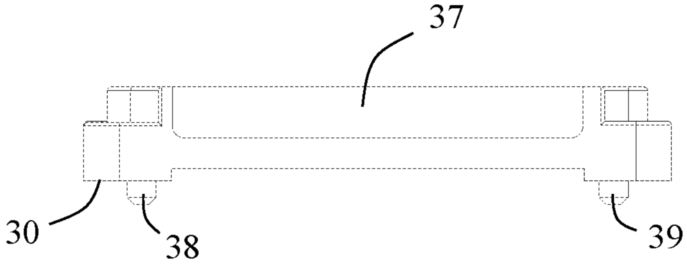
FIG. 10 is a front view of the base in FIG. 6.
Figure 11:
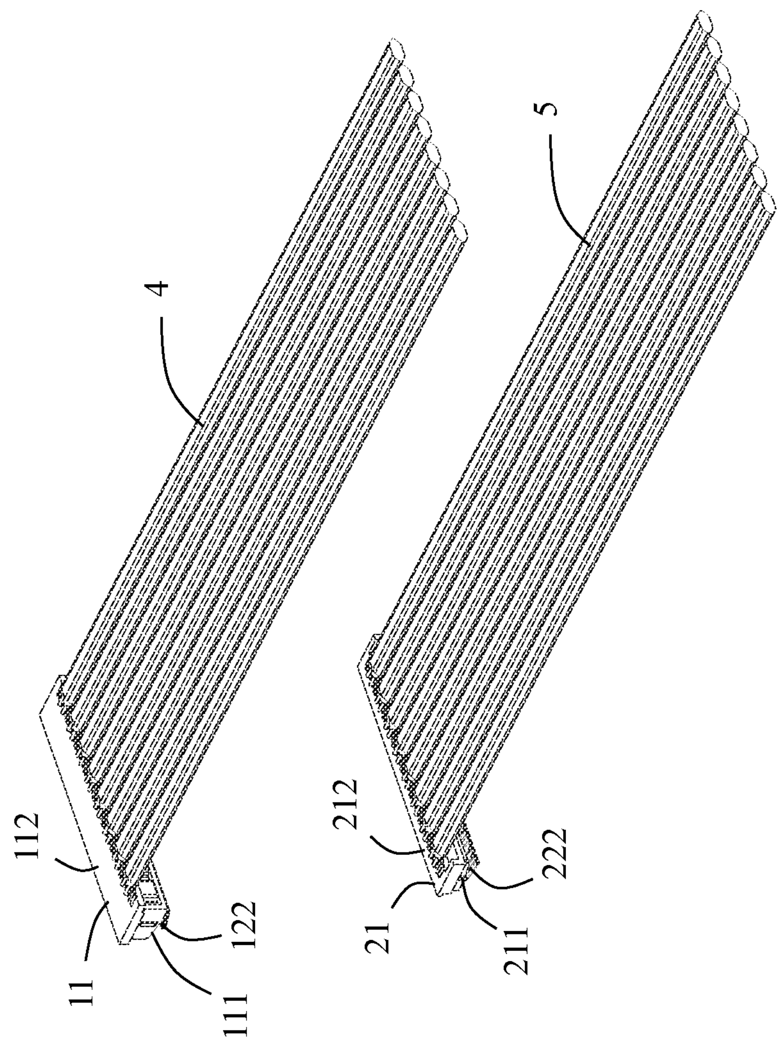
FIG. 11 is an exploded perspective view of a first terminal module connected to first cables and a second terminal module connected to second cables in FIG. 6, when the first terminal module and the second terminal module are separated from each other.
Figure 12:
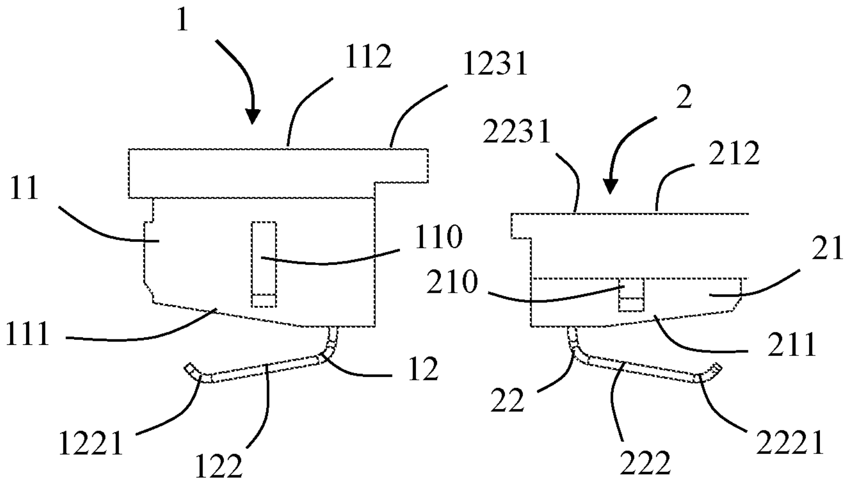
FIG. 12 is a side view of the first terminal module and the second terminal module.
Figure 13:
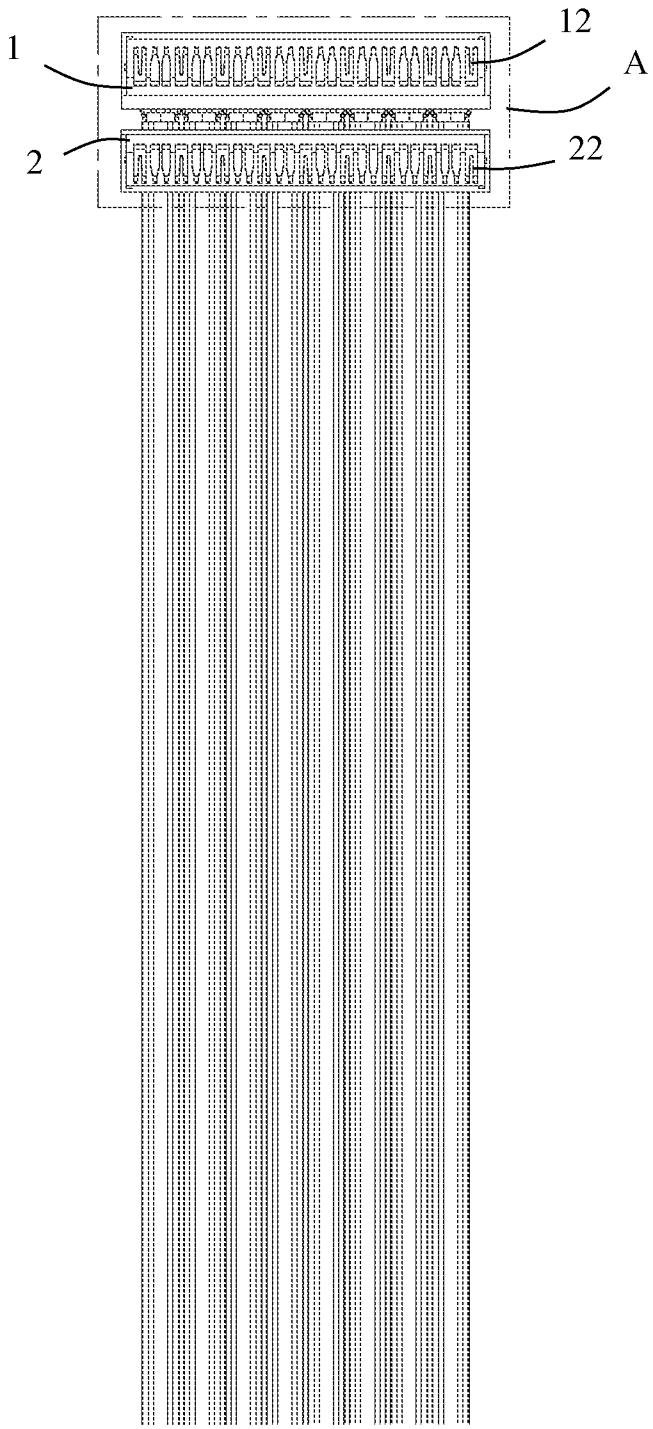
FIG. 13 is a bottom view of the first terminal module, the first cables, the second terminal module, and the second cables in FIG. 6.

The base 3 includes a mounting surface 30 at the bottom, and a first positioning protrusion 38 and a second positioning protrusion 39 protruding downwardly beyond the mounting surface 30. The first positioning protrusion 38 and the second positioning protrusion 39 are used to be inserted into the first positioning hole 205 and the second positioning hole 206 of the circuit board 300, respectively, so as to achieve positioning. The main body portion 31 includes a first receiving groove 311 extending through the mounting surface 30, a second receiving groove 312 extending through the mounting surface 30, a first positioning groove 313 located on one side of the main body portion 31, and a second positioning groove 314 located on the other side of the main body portion 31. In the illustrated embodiment of the present disclosure, the first receiving groove 311 and the second receiving groove 312 are both rectangular. The base 3 includes a first circumferential wall 33 surrounding the first receiving groove 311 and a second circumferential wall 34 surrounding the second receiving groove 312. The first positioning groove 313 and the second positioning groove 314 are counter-bores. The base 3 includes a first arc-shaped concave surface 35 exposed in the first positioning groove 313 and facing the second positioning groove 314, and a second arc-shaped concave surface 36 exposed in the second positioning groove 314 and facing the first positioning groove 313. Referring to FIG. 5, the main body portion 31 further includes a receiving space 37 extending upwardly. The receiving space 37 communicates with the first receiving groove 311 and the second receiving groove 312. The receiving space 37 is used for accommodating the cover 6. In an embodiment of the present disclosure, the base 3 is made of a metal material so as to provide better shielding effect for the conductive terminals.

Referring to FIGS. 11 to 17, the first terminal module 1 includes a first insulating block 11 and a plurality of first conductive terminals 12 fixed to the first insulating block 11. In an embodiment of the present disclosure, the plurality of first conductive terminals 12 are insert-molded with the first insulating block 11. Of course, in other embodiments, the plurality of first conductive terminals 12 may also be fixed to the first insulating block 11 by means of assembling or the like. The first insulating block 11 includes first abutting protrusions 110 on two sides thereof. The first insulating block 11 is clamped in the first receiving groove 311 so as to assemble the first terminal module 1 to the base 3. The first abutting protrusions 110 interfere with an inner surface of the first circumferential wall 33 so as to improve the holding force. In addition, the first insulating block 11 further includes an inclined first bottom surface 111 and a flat first surface 112 which is opposite to the first bottom surface 111.

Each first conductive terminal 12 includes a first fixing portion 121 fixed in the first insulating block 11, a first elastic arm 122 bent and extended from one end of the first fixing portion 121, and a first tail 123 bent and extended from the other end of the first fixing portion 121. In the illustrated embodiment of the present disclosure, each first conductive terminal 12 is substantially Z-shaped. The first fixing portion 121 extends in a vertical direction. The first tail 123 extends in a horizontal direction. An extension direction of the first elastic arm 122 is opposite to an extension direction of the first tail 123. The first tail 123 is exposed on the first surface 112 so as to facilitate electrical connection with the first cable 4. In the illustrated embodiment of the present disclosure, the first tail 123 includes a first upper surface 1231. The first upper surface 1231 is flush with the first surface 112. The first elastic arm 122 extends downwardly to protrude beyond the first bottom surface 111. The first bottom surface 111 can limit the first elastic arm 122 so as to prevent excessive deformation when the first elastic arm 122 is elastically deformed by an external force. The first elastic arm 122 includes a first abutting portion 1221 protruding downwardly and used to abut against the first conductive pad 201. Before being mounted onto the circuit board 200, the first abutting portion 1221 protrudes downwardly beyond the mounting surface 30. After being mounted onto the circuit board 200 and after the fasteners 300 fix the electrical connector 100 and the circuit board 200, the first abutting portion 1221 is substantially flush with the mounting surface 30.

Figure 14:
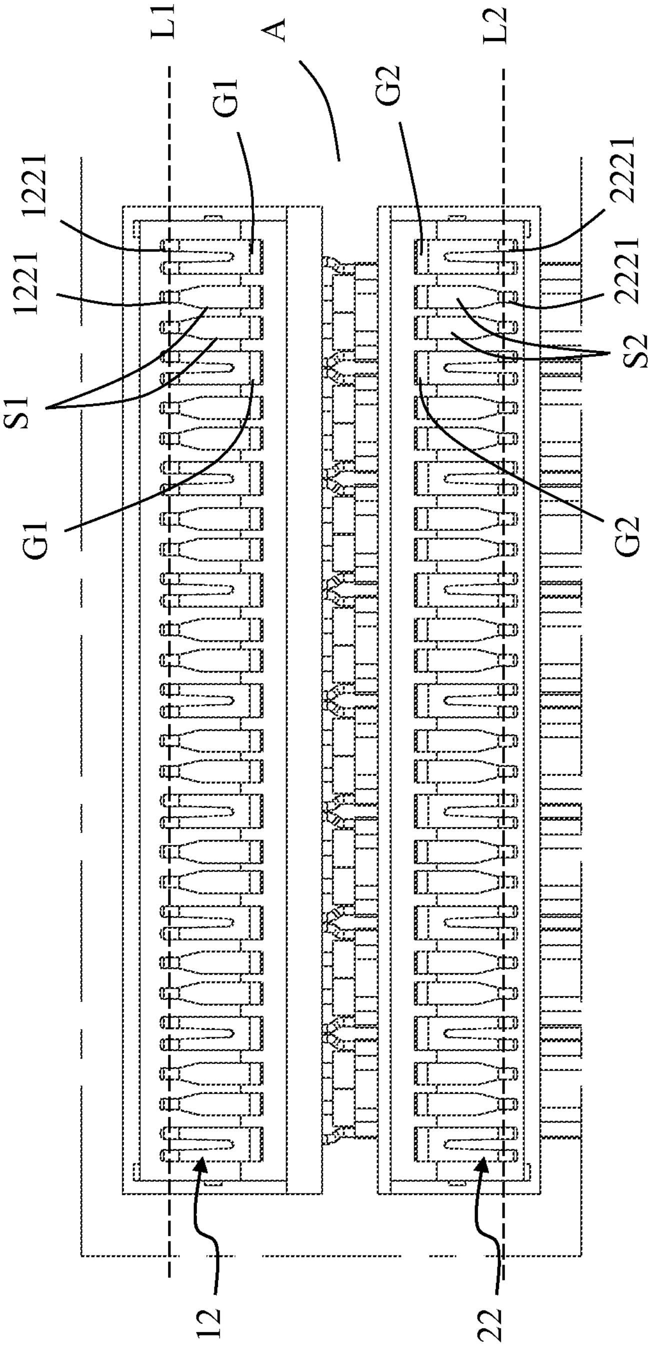
FIG. 14 is a partial enlarged view of a frame part A in FIG. 13.
Figure 15:
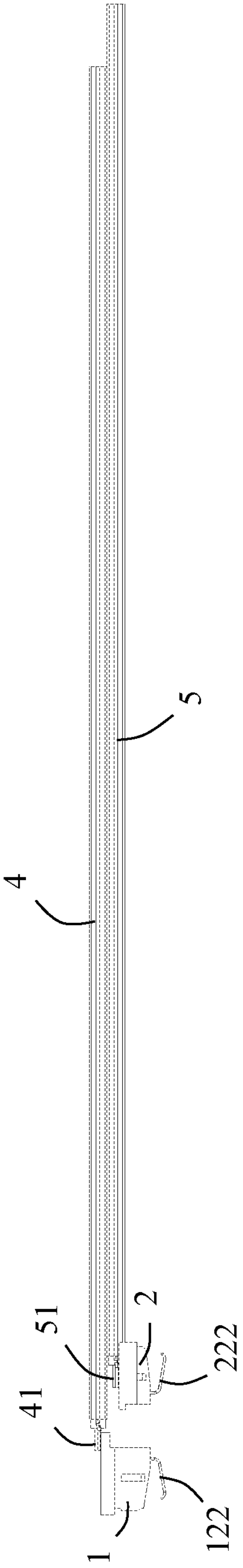
FIG. 15 is a side view of FIG. 13.
Figure 16:
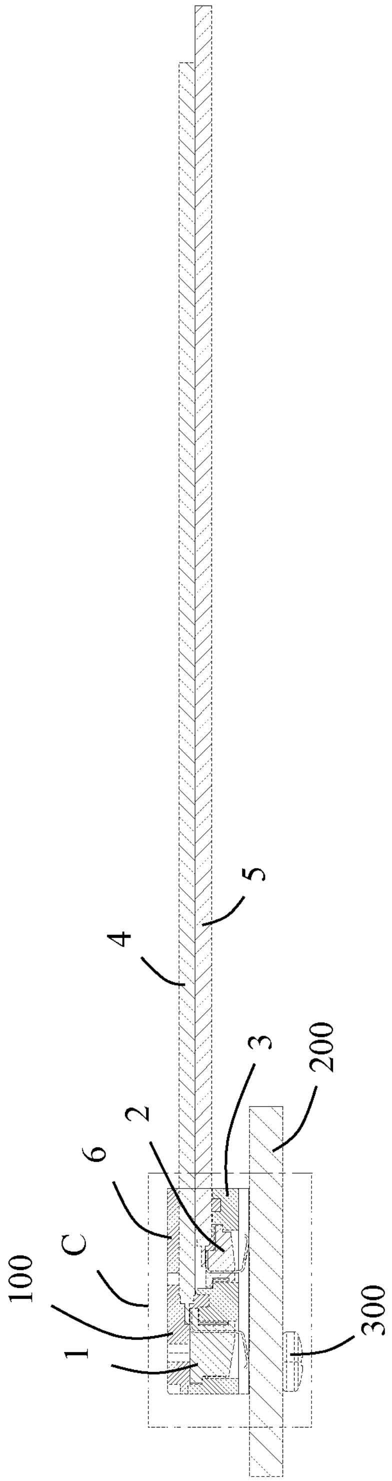
FIG. 16 is a schematic cross-sectional view taken along line B-B in FIG. 1.

Referring to FIG. 14, in the illustrated embodiment of the present disclosure, the plurality of first conductive terminals 12 include a plurality of groups of first signal terminals S1 and a plurality of first ground terminals G1 which are located on two sides of each group of first signal terminals S1. The first abutting portion 1221 of each first ground terminal G1 has a bifurcated shape so as to provide multiple points of contact, thereby improving the grounding shielding effect. In the illustrated embodiment of the present disclosure, a width of the first ground terminal G1 is greater than a width of each first signal terminal S1, so as to provide a better ground shielding effect for the first signal terminals S1.

Referring to FIGS. 11 to 17, the second terminal module 2 includes a second insulating block 21 and a plurality of second conductive terminals 22 fixed to the second insulating block 21. In an embodiment of the present disclosure, the plurality of second conductive terminals 22 are insert-molded with the second insulating block 21. Of course, in other embodiments, the plurality of second conductive terminals 22 may also be fixed to the second insulating block 21 by means of assembling or the like. The second insulating block 21 includes second abutting protrusions 210 on two sides thereof. The second insulating block 21 is clamped in the second receiving groove 312 so as to assemble the second terminal module 2 to the base 3. The second abutting protrusions 210 interfere with an inner surface of the second circumferential wall 34 so as to improve the holding force. In addition, the second insulating block 21 further includes an inclined second bottom surface 211 and a flat second surface 212 which is opposite to the second bottom surface 211.

Each second conductive terminal 22 includes a second fixing portion 221 fixed in the second insulating block 21, a second elastic arm 222 bent and extended from one end of the second fixing portion 221, and a second tail 223 bent and extended from the other end of the second fixing portion 221. In the illustrated embodiment, each second conductive terminal 22 is substantially U-shaped. The second fixing portion 221 extends in the vertical direction. The second tail 223 extends in the horizontal direction. An extension direction of the second elastic arm 222 is the same as an extension direction of the second tail 223. The second tail 223 is exposed on the second surface 212 so as to facilitate electrical connection with the second cable 5. In the illustrated embodiment of the present disclosure, the second tail 223 includes a second upper surface 2231. The second upper surface 2231 is flush with the second surface 212. The second elastic arm 222 extends downwardly to protrude beyond the second bottom surface 211. The second bottom surface 211 can limit the second elastic arm 222 so as to prevent excessive deformation when the second elastic arm 222 is elastically deformed by an external force. The second elastic arm 222 includes a second abutting portion 2221 protruding downwardly and used to abut against the second conductive pad 202. Before being mounted onto the circuit board 200, the second abutting portion 2221 protrudes downwardly beyond the mounting surface 30. After being mounted onto the circuit board 200 and after the fasteners 300 fix the electrical connector 100 and the circuit board 200, the second abutting portion 2221 is substantially flush with the mounting surface 30.

In the illustrated embodiment of the present disclosure, the first fixing portion 121 of the first conductive terminal 12 and the second fixing portion 221 of the second conductive terminal 22 are separated by the base 3 of metal to achieve the shielding effect between the first conductive terminal 12 and the second conductive terminal 22. In addition, the extension directions of the first elastic arm 122 and the second elastic arm 222 are opposite. With this arrangement, the first fixing portion 121 and the second fixing portion 221 can be relatively close so as to reduce a space to be occupied. In the illustrated embodiment of the present disclosure, the first fixing portion 121 and the second fixing portion 221 are surrounded by the first circumferential wall 33 of metal and the second circumferential wall 34 of metal, respectively, so as to achieve better shielding effect.

Referring to FIG. 14, in the illustrated embodiment of the present disclosure, the plurality of second conductive terminals 22 include a plurality of groups of second signal terminals S2 and a plurality of second ground terminals G2 which are located on two sides of each group of second signal terminals S2. The second abutting portion 2221 of each second ground terminal G2 has a bifurcated shape so as to provide multi-point contact, thereby improving the grounding shielding effect. In the illustrated embodiment of the present disclosure, a width of the second ground terminal G2 is greater than a width of each second signal terminal S2, so as to provide a better ground shielding effect for the second signal terminals S2. In some embodiments, a distance between adjacent terminals in each group of first signal terminals S1 or each group of second signal terminals S2 is 0.55 mm. A distance between the first ground terminals G1 located on two sides of each group of first signal terminals S1 or a distance between the second ground terminals G2 located on two sides of each group of second signal terminals S2 is 2 mm.

Figure 17:
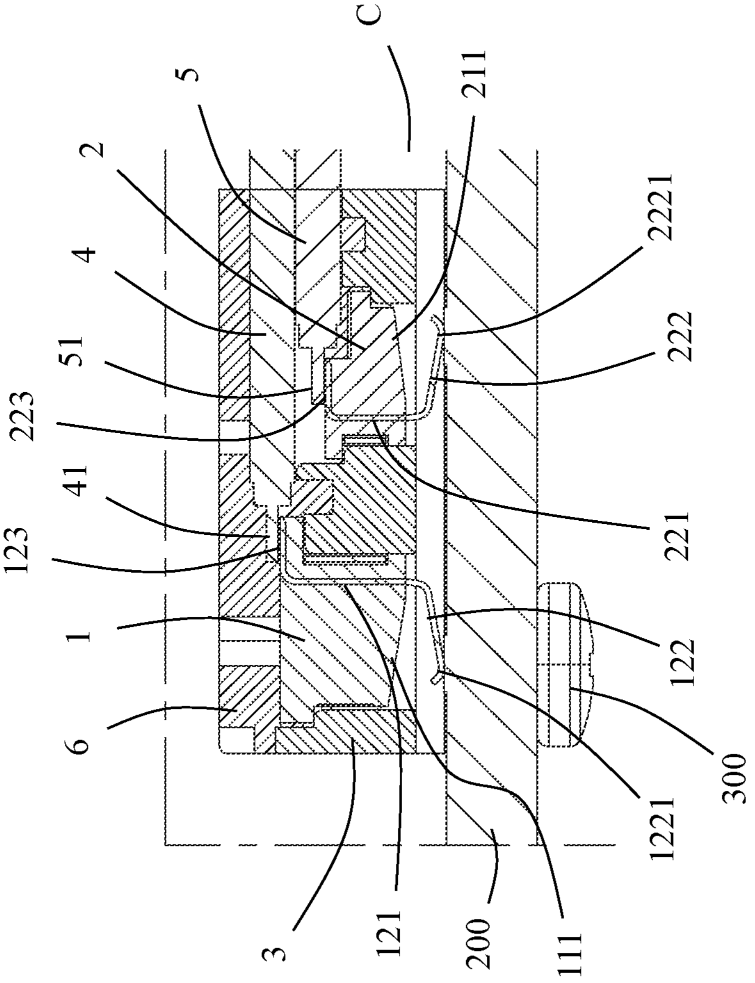
FIG. 17 is a partial enlarged view of a frame part C in FIG. 16.

In the illustrated embodiment of the present disclosure, the first abutting portions 1221 are disposed in a first row L1. The second abutting portions 2221 are disposed in a second row L2. The first abutting portions 1221 and the second abutting portions 2221 are parallel to each other (that is, the first row L1 and the second row L2 are parallel to each other). Referring to FIG. 17, the first fixing portion 121 and the second fixing portion 221 extend in the vertical direction and are parallel to each other. The first tail 123 and the second tail 223 extend in the horizontal direction and are parallel to each other. The first elastic arm 122 and the first tail 123 are completely staggered in the vertical direction. The second elastic arm 222 and the second tail 223 are at least partially overlapped in the vertical direction. The extension directions of the first elastic arm 122 and the second elastic arm 222 are opposite, thereby reducing a space occupied by the first elastic arm 122 and the second elastic arm 222, which is beneficial to miniaturization of the electrical connector 100 and the connector assembly.

In the illustrated embodiment of the present disclosure, the first tail 123 is higher than the second tail 223, so that the first tail 123 and the second tail 223 are separated by a certain distance in the vertical direction. As a result, it is beneficial to electrically connect (i.e., solder) with the first cable 4 and the second cable 5, respectively. Each first cable 4 includes a first core wire 41 electrically connected (i.e., soldered or welded) to the first tail 123. Each second cable 5 includes a second core wire 51 electrically connected (i.e., soldered or welded) to the second tail 223.

As shown in FIGS. 5 to 9, the cover 6 partially covers the first cables 4 and the second cables 5 and is fixed to the base 3. In the illustrated embodiment of the present disclosure, the cover 6 includes a plurality of connecting protrusions 60 extending downwardly beyond a bottom surface of the cover 6, and a first positioning protrusion 61 and a second positioning protrusion 62 located on two sides of the cover 6, respectively. The first positioning protrusion 61 and the second positioning protrusion 62 are positioned in the first positioning groove 313 and the second positioning groove 314, respectively. The first positioning protrusion 61 includes a first arc-shaped convex surface 611 which mates with the first arc-shaped concave surface 35. The second positioning protrusion 62 includes a second arc-shaped convex surface 621 which mates with the second arc-shaped concave surface 36. In the illustrated embodiment of the present disclosure, the cover 6 covers junctions of the first cables 4 and the first tails 123, and also covers junctions of the second cables 5 and the second tails 223 so as to improve reliability. Therefore, the risk of the first cables 4 being separated from the first tails 123 and the risk of the second cables 5 being separated from the second tails 223 are reduced. Of course, in other embodiments, the cover 6 can also be directly formed at the junctions of the first cables 4 and the first tails 123, and the junctions of the second cables 5 and the second tails 223, and is combined with the base 3 as a whole.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

a base, the base comprising a mounting surface;

a plurality of first conductive terminals, the first conductive terminals being disposed on the base, each first conductive terminal comprising a first elastic arm protruding beyond the mounting surface; and a plurality of second conductive terminals, the second conductive terminals being disposed on the base, each second conductive terminal comprising a second elastic arm protruding beyond the mounting surface;

wherein the first elastic arm and the second elastic arm extend in opposite directions, the first elastic arm comprises a first abutting portion adapted to abut against a circuit board, and the second elastic arm comprises a second abutting portion adapted to abut against the circuit board;

each first conductive terminal further comprises a first tail for electrically connecting with a first cable and a first fixing portion connected with the first elastic arm and the first tail;

each second conductive terminal further comprises a second tail for electrically connecting with a second cable and a second fixing portion connected with the second elastic arm and the second tail;

the first fixing portion and the second fixing portion extend in a first direction and are parallel to each other, the first tail and the second tail extend in a second direction and are parallel to each other, the first direction and the second direction are perpendicular to each other, the first elastic arm and the first tail are completely staggered in the first direction, and the second elastic arm and the second tail are at least partially overlapped in the first direction;

wherein the base comprises a first receiving groove extending through the mounting surface and a second receiving groove extending through the mounting surface;

wherein the electrical connector further comprises a first terminal module and a second terminal module, the first terminal module comprises a first insulating block to which the first conductive terminals are fixed, and the first insulating block is clamped in the first receiving groove;

wherein the second terminal module comprises a second insulating block to which the second conductive terminals are fixed, and the second insulating block is clamped in the second receiving groove.

2. The electrical connector according to claim 1, wherein the base is made of a metal material.

3. The electrical connector according to claim 1, wherein the first conductive terminals are insert-molded with the first insulating block, and the second conductive terminals are insert-molded with the second insulating block.

4. The electrical connector according to claim 1, wherein the first fixing portion is fixed to the first insulating block;

wherein the second fixing portion is fixed to the second insulating block.

5. The electrical connector according to claim 4, wherein the first insulating block comprises a first surface, the first tail is in a shape of a flat plate and is exposed on the first surface, and each first cable comprises a first core wire soldered or welded to the first tail; and wherein the second insulating block comprises a second surface, the second tail is in a shape of a flat plate and is exposed on the second surface, and each second cable comprises a second core wire soldered or welded to the second tail.

6. The electrical connector according to claim 5, further comprising a cover partially covering the first cables and the second cables, and the cover being fixed to the base.

7. The electrical connector according to claim 4, wherein the first direction is a vertical direction and the second direction is a horizontal direction.

8. The electrical connector according to claim 7, wherein the first tail is higher than the second tail.

9. An electrical connector, comprising:

a base, the base comprising a mounting surface;

a plurality of first conductive terminals, the first conductive terminals being disposed on the base, each first conductive terminal comprising a first elastic arm protruding beyond the mounting surface; and a plurality of second conductive terminals, the second conductive terminals being disposed on the base, each second conductive terminal comprising a second elastic arm protruding beyond the mounting surface;

wherein the first elastic arm and the second elastic arm extend in opposite directions, the first elastic arm comprises a first abutting portion adapted to abut against a circuit board, and the second elastic arm comprises a second abutting portion adapted to abut against the circuit board;

wherein the plurality of first conductive terminals comprise a plurality of groups of first signal terminals and a plurality of first ground terminals which are disposed on two sides of each group of first signal terminals, the first abutting portion of each first ground terminal has a bifurcated shape;

the plurality of second conductive terminals comprise a plurality of groups of second signal terminals and a plurality of second ground terminals which are located on two sides of each group of second signal terminals, and the second abutting portion of each second ground terminal has a bifurcated shape.

10. A connector assembly, comprising:

an electric connector, the electrical connector comprising:

a base, the base comprising a mounting surface;

a plurality of first conductive terminals, the first conductive terminals being disposed on the base, each first conductive terminal comprising a first elastic arm protruding beyond the mounting surface and a first tail electrically connected with a first cable; and a plurality of second conductive terminals, the second conductive terminals being disposed on the base, each second conductive terminal comprising a second elastic arm protruding beyond the mounting surface and a second tail electrically connected with a second cable;

wherein the first elastic arm and the second elastic arm extend in opposite directions, each first elastic arm comprises a first abutting portion having an arc-shaped first abutting surface, and each second elastic arm comprises a second abutting portion having an arc-shaped second abutting surface; and a circuit board, the circuit board comprising a plurality of first conductive pads and a plurality of second conductive pads, the arc-shaped first abutting surfaces of the first conductive terminals abutting against the first conductive pads, and the arc-shaped second abutting surfaces of the second conductive terminals abutting against the second conductive pads;

wherein the plurality of first conductive terminals comprise a plurality of groups of first signal terminals and a plurality of first ground terminals which are disposed on two sides of each group of first signal terminals, the first abutting portion of each first ground terminal has a bifurcated shape;

the plurality of second conductive terminals comprise a plurality of groups of second signal terminals and a plurality of second ground terminals which are located on two sides of each group of second signal terminals, and the second abutting portion of each second ground terminal has a bifurcated shape.

11. The connector assembly according to claim 10, wherein the base comprises a first receiving groove extending through the mounting surface and a second receiving groove extending through the mounting surface;

wherein the electrical connector further comprises a first terminal module and a second terminal module, the first terminal module comprises a first insulating block to which the first conductive terminals are fixed, and the first insulating block is clamped in the first receiving groove;

wherein the second terminal module comprises a second insulating block to which the second conductive terminals are fixed, and the second insulating block is clamped in the second receiving groove.

12. The connector assembly according to claim 11, wherein the first conductive terminals are insert-molded with the first insulating block, and the second conductive terminals are insert-molded with the second insulating block.

13. The connector assembly according to claim 11, wherein each first conductive terminal further comprises a first fixing portion connected with the first elastic arm and the first tail, and the first fixing portion is fixed to the first insulating block;

wherein each second conductive terminal further comprises a second fixing portion connected with the second elastic arm and the second tail, and the second fixing portion is fixed to the second insulating block.

14. The connector assembly according to claim 13, wherein the first insulating block comprises a first surface, the first tail is in a shape of a flat plate and is exposed on the first surface, and each first cable comprises a first core wire soldered or welded to the first tail; and wherein the second insulating block comprises a second surface, the second tail is in a shape of a flat plate and is exposed on the second surface, and each second cable comprises a second core wire soldered or welded to the second tail.

15. The connector assembly according to claim 14, the electrical connector further comprises a cover partially covering the first cables and the second cables, and the cover is fixed to the base.

16. The connector assembly according to claim 13, wherein the first fixing portion and the second fixing portion extend in a vertical direction and are parallel to each other, the first tail and the second tail extend in a horizontal direction and are parallel to each other, the first elastic arm and the first tail are completely staggered in the vertical direction, and the second elastic arm and the second tail are at least partially overlapped in the vertical direction.

17. The connector assembly according to claim 16, wherein the first tail is higher than the second tail.

18. The connector assembly according to claim 10, wherein the base is made of a metal material.

* * * * *